Figure 1:
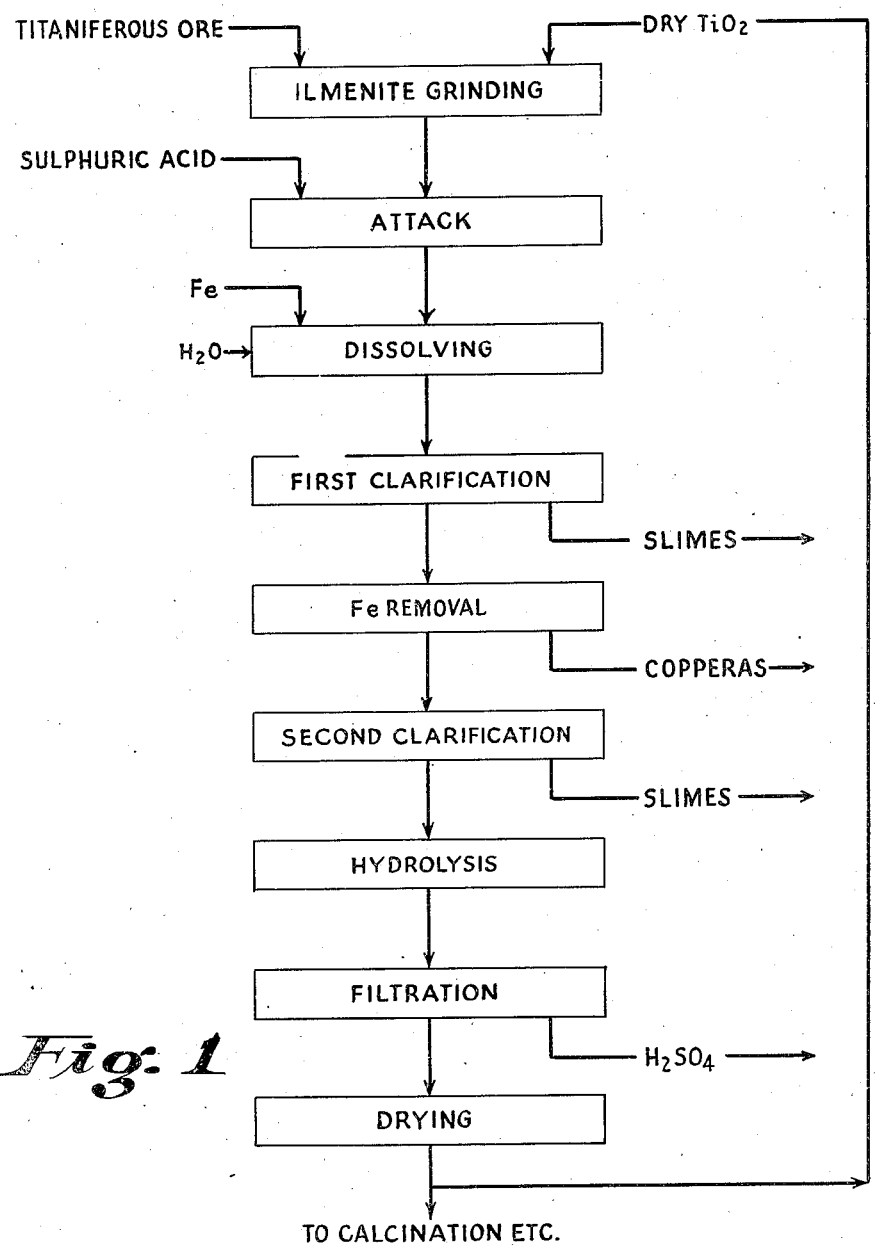

Dec. 31, 1946.    R. M. McADAM    2,413,640
PRODUCTION OF STABLE TITANIUM SOLUTIONS
Filed May 26, 1944

Robert M. McAdam, INVENTOR.
BY John P. Hancock
ATTORNEY

Patented Dec. 31, 1946

2,413,640

UNITED STATES PATENT OFFICE 2,413,640

PRODUCTION OF STABLE TITANIUM SOLUTIONS

Robert M. McAdam, Wilmington, Del., assignor to E. I. du Pont de Nemours & Company, Wilmington, Del., a corporation of Delaware Application May 26, 1944, Serial No. 537,408

3 Claims. (Cl. 23—117)

This invention relates to the production of soluble titanium compounds from titaniferous ores, and more particularly to the preparation of titanium salt solutions having a high titanium content from relatively low-grade titaniferous materials.

More specifically, the invention relates to an improved process for obtaining a stable titanium sulfate solution by interacting a domestic titaniferous ore, such as ilmenite, with a mineral acid solubilizing agent, such as sulfuric acid.

Titanium oxide is an important white pigment used in many commercial applications and particularly in coating compositions, such as paints, enamels, and lacquers. It is usually obtained by calcining the purified $TiO_2$ precipitate recovered from the hydrolysis of a titanium sulfate solution prepared by dissolving ilmenite, previously ground to about 200 mesh, with sulfuric acid. This yields a substantially dry, sulfated acid, "attack mass," consisting of a mixture of titanium and iron sulfates together with small amounts of free sulfuric acid. This mass then is dissolved in water (usually with a small amount of sulfuric acid) and a solution results of about 50° Bé. containing finely-divided and colloidally-dispersed slimes adapted to be removed through clarification treatment. Upon suitably cooling the clarified solution, crystals of iron sulfate or copperas result, following the removal of which a second clarification or purification treatment is resorted to in order to provide a solution in satisfactory condition for hydrolysis and $TiO_2$ precipitation.

Although titanium is the ninth most abundant element and large quantities exist in the Western Hemisphere, practically all $TiO_2$ produced in this country is derived from beach sand ilmenite ore obtained in Travancore, India. This sand is an exceedingly fine type of titaniferous material which can be easily concentrated and shipped at low cost to this country. Its $TiO_2$ content is around 60–61% and its iron (Fe) content analyzes to about 24–25% (approximately 40 parts of iron to each 100 parts of $TiO_2$). In contrast to this, other ores, such as domestic ilmenite (United States, Canadian, etc.) run to only about 35–45% $TiO_2$ and have an undesirably high iron content of 30–40%. That is, they will contain in excess of 60 parts and may range up to 100 parts or greater of iron for each 100 parts of $TiO_2$. Oxides of other elements (magnesium, aluminum, silicon, zirconium, chromium, vanadium, phosphorus, members of the rare earth metals group, etc.), in amounts up to 5% or greater, also may be present as impurities in both types of ores. In further illustration of the wide divergence in composition which exists between Indian and domestic ores, there is given below a comparative analysis of representative Indian, United States (Adirondack), and Canadian ilmenites:

Table I

|  | Indian | Adirondack | Canadian |
|---|---|---|---|
|  | Per cent | Per cent | Per cent |
| $TiO_2$ | 61.0 | 44.4 | 39.0 |
| Fe (total) | 25.0 | 33.1 | 36.1 |
| FeO | 10.7 | 37.4 | 29.1 |
| $Fe_2O_3$ | 23.8 | 5.8 | 19.3 |
| $Fe/TiO_2$ | .41 | .74 | .93 |

Because Indian ilmenite has a high titanium value and lower iron content, it is favored most among $TiO_2$ manufacturers as a titanium source, since its use affords production of solutions of low $Fe-TiO_2$ ratio, essential to processes which will yield pigments of uniformly high quality. The presently existing unsettled international situation has disrupted supplies of Indian ilmenite to this country, with the result that pigment manufacturers must now resort to domestic type ores higher in iron and lower in titanium content in their $TiO_2$ production. Sulfate solutions prepared from these ores present many serious problems in procuring a satisfactory type of solution for hydrolysis. Thus, while Indian and domestic ores react with sulfuric acid of the proper strength under conditions well understood in the art, subsequent dissolution of the sulfated masses provides titanium solutions of naturally different composition. Each will contain colloidally dispersed slimes which must be coagulated and removed but the ease of accomplishing this is to a large extent dependent upon concentration and gravity of the involved solution. Solutions of low specific gravity clarify more readily but the concentration may be lower than required in subsequent steps of the titanium-producing operation. To illustrate, it is undesirable to work with solutions of greater than 1.6 specific gravity (approximately 54° Bé). More concentrated solutions than this are very difficult to properly clarify or free from colloidal slimes or other materials and this difficulty increases rapidly with increase of concentration. Since specific gravity depends on the dissolved salts and acid, a variation in the composition of the ore as well as a variation in the ratio of ore to acid will cause a substantial change in solution composition, even though the specific gravity be held substantially constant. Hence, solutions from Indian sand will be quite different from those obtained from domestic ores, even though in both instances the same ratio of titanium to free sulfuric acid prevails.

While the maximum gravity at which a domestic ore solution can be clarified in order to free it of slimes and impurities is substantially the same as that for an Indian ilmenite solution, the $TiO_2$ content of the domestic ore solution may suffer a 30% drop. In addition, its iron content will increase as the titanium content decreases. Again, and as already stated, the later steps in the titanium operation, especially during hydrolysis, require the existence of a relatively constant ratio of sulfuric acid, over and above that required to form the sulfate of iron, to titanium, e. g., that a ratio of around 1.7 mols of $H_2SO_4$ per mol of $TiO_2$, preferably prevail. The excessive amount of iron carried into the solution from domestic ores and the consequent decrease in titanium content will result in an unstable form of solution undesirably low in free sulfuric acid content. Such solutions tend to develop premature hydrolysis or become "active" by reason of the formation and presence therein of undesired so-called "wild" seeds or nuclei. In the following table, analyses are given of solutions prepared from the ores shown in Table I through reaction of sulfuric acid, followed by dissolving with acidified water and with metallic iron to reduce any ferric iron present and, in addition, provide a small amount of trivalent titanium to assure the absence of ferric iron in the solution:

*Table II*

|  | Indian | Adirondack | Canadian |
|---|---|---|---|
| Baumé_____degrees__ | 52 | 52 | 52 |
| $TiO_2$_____grams per liter_ | 156 | 137 | 112 |
| Fe_____ | 112 | 121 | 136 |
| $H_2SO_4$ (active)_____do___ | 324 | 285 | 233 |
| Fe/$TiO_2$_____ | .72 | .88 | 1.21 |
| $H_2SO_4$/$TiO_2$ (molar)_____ | 1.7 | 1.7 | 1.7 |

The wide variation in titanium content of solutions prepared from various titaniferous ores is evident from this table. The domestic ilmenite solutions in said table develop activity in their passage through the plant. While their acid content may be increased so as to stabilize them and provide a molar ratio of acid to titanium in excess of 1.7, acid addition to solutions low in titanium is objectionable because a further drop in the $tiO_2$ content results, when holding the Baumé constant, and a greater plant capacity is required to handle a given tonnage of soluble $TiO_2$. A still greater objection resides in the fact that the resulting solutions become too high in active acid and do not hydrolyze readily and then at lower yields, with the result that a poor quality of pigment is obtained. As a consequence, existing processes for obtaining hydrolyzable solutions of a satisfactory type from domestic ores are unsuitable and a primary object of the present invention is to overcome these and other difficulties encountered in previous efforts to obtain such satisfactory solutions.

It is among the further and particular objects of this invention to provide a stable type of hydrolyzable titanium sulfate solution having a high titanium oxide content, from domestic ilmenite ores; to provide a novel method for regulating the iron-titanium ratio of said solutions without depending upon the source of the ore used in their preparation; to provide titanium sulfate solutions of this type which have a composition comparable to solutions produced from the solubilization of Indian ilmenite with sulfuric acid; and to provide crystalloidal solutions of titanium sulfate of high clarity from domestic ores which are readily adapted to hydrolysis for the production of high quality $TiO_2$ products yielding $TiO_2$ pigments of excellent quality upon conventional calcination. Further objects and advantages of the invention will be evident from the following description and accompanying drawing in which the single figure comprises a diagrammatic flow sheet of a titanium sulfate-producing operation, in accordance with one method of adapting the invention.

The foregoing and other objects are attainable in this invention which comprises modifying conventional processes for obtaining hydrolyzable titanium sulfate solutions by returning, in unconverted state, a minor but substantial amount of the titanium hydrate precipitated and recovered from the solution being hydrolyzed, particularly the product recovered in the drying stage of the system prior to its passage to the calciner for pigment development.

Referring to the drawing and to one preferred method of carrying out the invention, there are illustrated the usual steps in a titanium oxide pigment-producing operation for preparing and hydrolyzing a titanium sulfate solution. These comprise the ore grinding and ore-acid attack stages, as well as the dissolving, first clarification, iron removal, second clarification, hydrolysis, filtration and drying stages of said operation. In accordance with this invention, all of these steps are resorted to, except that a portion of the $TiO_2$ recovered in the drying stage is recycled to the ore grinding stage in order to regulate and control the composition of the solution obtained in the dissolving operation and going to the clarification and hydrolysis stages of the system.

Thus, in accordance with one practical and preferred adaptation of the invention, one may readily obtain in the dissolving stage of a $TiO_2$-producing system, a stable titanium sulfate solution having a gravity of 1.54–1.57 (51–53° Bé.), at 55° C., a $TiO_2$ concentration in excess of 140 g./l., and a constant ratio of sulfuric acid, over and above that required to form iron sulfate, of about 1.7 mols $H_2SO_4$ per mol of $TiO_2$, by mixing with domestic ore undergoing grinding prior to acid attack sufficient dried $TiO_2$ from the hydrolysis as to insure production of a solution, going to the first clarification stage of the system, having an iron content of less than 90 parts per 100 parts of $TiO_2$, and preferably from 70 to 80 parts of iron per 100 parts of dissolved $TiO_2$, said latter range being comparable in analysis to that shown in Table II above for Indian ilmenite (containing from about .7–.8 part by weight of iron for each part by weight of $TiO_2$). With Indian ore, the solution from the dissolving operation, before copperas removal, is approximately that shown in Table II. Subsequent to crystallization, its $TiO_2$ content may exceed 180 g./l. while its iron content will be around 60 g./l. Said iron content is about 3 pounds per 10 pounds of $TiO_2$, as compared to about 7 pounds of iron per 10 pounds of $TiO_2$ in the original solution. The ore so admixed with the $TiO_2$ may comprise any type of titaniferous material containing, as stated, in excess of 60 parts of iron per 100 parts of $TiO_2$. Examples of such ores include New York (Adirondack), Canada, Virginia, California, etc. ilmenites.

After intimately associating the requisite amount of recirculated TiO₂ with the ore, the resulting mixture is conventionally decomposed in a suitable vessel by reacting in the ratio of about 1 part of the crushed or pulverized (200 mesh or finer size) ilmenite-TiO₂ mixture with about 1.5 parts of relatively concentrated (80–90%) sulfuric acid. If desired, decomposition can be accelerated by applying heat to the reaction vessel or by admitting steam to the reactants. The dry sulfated attack mass which results on completion of the decomposition reaction is then suitably lixiviated, as by adding sufficient water or acidified liquor (diluted sulfuric acid) thereto to obtain a solution for passage to the first clarification stage of the system having the gravity and other values above mentioned.

The TiO₂ which is returned for admixture with the ore prior to the attack preferably comprises a previously dried, uncalcined hydrate from the hydrolysis stage. Use of the TiO₂ in this state avoids undesired acid dilution in the attack stage. Though obviously less desirable, an undried filter cake could be used. The amount of TiO₂ which is recycled is dependent upon the ratio of iron to titanium in the ore and the TiO₂ deficiency of the solution going to the first clarification. In general, most advantageous results will be found to accrue under the invention when about 20% to 50% of the material going to the first clarification stage is derived from the recycled TiO₂.

By means of the recirculation of the dried TiO₂, as herein contemplated, the characteristics of the solution going to the first clarification and subsequent stages of the titanium-producing operation will be effectively regulated and controlled and said solution will be essentially the same as if Indian ilmenite was being consumed in the plant as a source of the titanium raw material. Furthermore, it will be characterized by substantially complete freedom from any danger of activity or development of premature hydrolysis by reason of the presence of undesired seed nuclei or wild seeds.

In addition, the present process enables one to avoid the use of high sulfuric acid-titanium ratios in the solutions which would be otherwise required to prevent premature hydrolysis of the solution and a complete avoidance of a radical change in its chemical composition. Hence, the present invention renders it possible to continue plant operations in the normal way, in the absence of Indian ilmenite ore employment, except that a portion of the TiO₂ hydrate from the hydrolysis is recycled to an initial stage of the TiO₂-producing system. With this exception, the plant can continue to employ domestic ores without incurring any sacrifice in quality of hydrolysate or ultimate TiO₂ pigment, or encountering other dangers attending the use of modified operations due to the high iron-titanium ratio present in the starting material.

To a clearer understanding of the invention, the ensuing specific examples are given which are only intended as in further illustration but not in limitation of the invention:

Example I 133 tons of finely-ground domestic ilmenite ore, analyzing 39% TiO₂, and 35.3 tons of TiO₂, as a dried, powdered form of hydrolysate product from the hydrolysis stage of the TiO₂-producing system, are thoroughly mixed and converted to water-soluble sulfates by treatment with 250 tons of H₂SO₄. The solubilized mass is then dissolved, with the aid of 7.4 tons H₂SO₄, in water, and 11.1 tons of scrap iron to reduce the ferric iron content of the ilmenite and a portion of the soluble titanium sulfates to the trivalent condition. The resulting solution had a specific gravity corresponding to 52° Baumé at 55° C., and analyzed 156 grams TiO₂ per liter and 112 grams Fe per liter. The iron titanium oxide ratio was .72 and the solution contained 1.7 mols of available sulfuric acid per mol of TiO₂.

This solution was clarified, chilled to remove iron in the usual manner, and it was then hydrolyzed to precipitate pigment-grade raw TiO₂, in accordance with the disclosure of U. S. Reissue 18,854. A portion of the recovered hydrolysate was withdrawn for reuse in a future attack, as shown above, while the remainder was purified, calcined in the presence of an alkali metal salt fritting agent (U. S. Patent 1,892,693), and otherwise conventionally processed to provide a high-grade TiO₂ pigment of optimum quality, equal to that produced from low iron titanium oxide ratio Indian ilmenite.

Example II 24.6 tons of TiO₂ as a hydrolysate product was removed from the pigment processing operation and dried to 83% TiO₂ content. This product was substantially free of iron and the remaining 17% was made up of adsorbed water and H₂SO₄. This titanium hydrate product was mixed with 128 tons of Canadian ilmenite after which the mixture was ground to 98% through a 200 mesh screen. The resulting titaniferous blend was then mixed with 244 tons of sulfuric acid, subsequent conversion of the iron and titanium contents to the soluble condition being effected by reaction upon application of heat. Upon dissolution of the resulting mass in water and after 11.3 tons of scrap iron addition, it was found that 89.4% of the titanium oxide content of the charge had been solubilized along with 54 tons of iron (including that used as reducing agent). The solution thus obtained had an iron-titanium ratio of .81 and analyzed 141 grams of TiO₂ per liter and 114 grams Fe per liter with a ratio of 1.83 mols H₂SO₄ per mol of TiO₂.

This solution, upon being hydrolyzed as in Example I, provided a precipitate which upon being calcined under optimum conditions and in accordance with the procedures of Blumenfeld 1,892,693, was found to be equal to any pigment yet produced from solutions prepared from low iron beach sand Indian ilmenites.

As stated above, the ore and recycled, dried TiO₂ hydrate are preferably mixed together and then ground, which promotes dispersion of said TiO₂ throughout the ore. The resulting finely-divided mixture of titaniferous materials is then converted to sulfates by reaction with sulfuric acid in accordance with accepted practice. The sulfate mass is then dissolved in the usual way, and established prior art practice is then followed in the processing of the solution. The titanium hydrate is supplied by the process itself since a portion of the hydrolysate is withdrawn from a later step of the pigment process, is dried and returned to be attacked with sulfuric acid along with the high iron ilmenite.

Obviously, the process is subject to considerable variation, and in its practice it is unnecessary to employ a titanium oxide in the recirculation which possesses potentially good pigment properties when calcined and finished in the accepted manner. For instance, use can be made of a below-pigment-grade quality type of hydrolysate, such as resulting by modifying the process through hydrolysis of the original solution as obtained upon dissolving through addition of water or dilute sulfuric acid to the sulfated ilmenited mass and without resorting to the usual clarification and copper as removal treatments. Such solutions give a satisfactory yield upon hydrolysis but the hydrate is unsatisfactory in respect to such pigment properties as color, tinting strength, and hiding power. As already pointed out, these properties are unimportant at the stage of the pigment-producing operation wherein their use is herein contemplated and the hydrolysate may be separated from the ferrous sulfate liquors and returned to the attack operation where it will be transformed to titanium sulfate along with the titanium content of the ilmenite to ultimately yield a satisfactory type of product.

While simultaneous grinding of the $TiO_2$ and the ilmenite is preferred, it is understood that mixing of the two after grinding but prior to the attack is also contemplated. They may be mixed in the dry state or slurried in a portion of the acid which is to be used in the attack and intimate admixture may be effected in this manner with the aid of agitation.

The titanium hydrolysates recirculated to the attack in this process may contain adsorbed sulfuric acid and this acid may be present to the extent of 8 or 10 pounds of $H_2SO_4$ per 100 pounds of $TiO_2$. Its presence in the recirculated product is not only unobjectionable but will prove advantageous. Hydrolysates containing substantial amounts of sulfuric acid are more reactive than those which are substantially free of adsorbed acid as a result of heat treatment and in no instance is it recommended that it be eliminated from the product. Excessive drying temperatures will decrease acid and this is to be avoided since it is only necessary to obtain a titanium oxide concentrate which is low enough in moisture to become powdery when subjected to a dry grinding operation. The dried product preferably analyzes about 80–90% $TiO_2$ with the remainder of its constituents being sulfuric acid and water.

The amount of hydrolysate or hydrate returned to the attack will depend in large measure on the iron-titanium oxide ratio on the domestic ilmenite available. In general, Canadian ore will require more $TiO_2$ recirculation than will Adirondack ore. It is advisable to maintain not more than between .7 and .8 pound of iron per pound of titanium oxide in the solution although up to about .9 pound of iron per pound of $TiO_2$ may be tolerated without too great a danger of premature hydrolysis of the solution.

Although a titanium sulfate solution having the values above-mentioned with respect to gravity, $TiO_2$ content, and ratio of $H_2SO_4$ to $TiO_2$ is preferred, other titanium sulfate solutions of different concentration, gravity and $H_2SO_4$-$TiO_2$ ratios may also be produced, in accordance with the invention. Thus, the invention is generally useful in obtaining a stable, hydrolyzable titanium sulfate solution going to the first clarification stage having a $TiO_2$ content of at least 140 g./l. and ranging up to, say, 180 g./l., a specific gravity (measured at 55° C.) of from 1.4 (42° Bé.) to 1.6 (54° Bé.), and an acidity equivalent to from about 1.6 to 1.8 mols of active $H_2SO_4$ per mol of $TiO_2$.

I claim as my invention:

1. A process for producing titanium dioxide which comprises the steps of extracting with $H_2SO_4$ a mixture of titanium-bearing ore containing in a combined form in excess of 60 parts of iron for each 100 parts of titanium oxide and sufficient added titanium dioxide recovered in the subsequent hydrolysis to produce in the subsequently-formed acid solution a ratio of Fe content to $TiO_2$ content of less than 4:5, leaching said treated mixture and producing a solution having a specific gravity of from 1.4 to 1.6 and a free $H_2SO_4$ content of 1.6 to 1.8 mols per mol dissolved $TiO_2$, removing insoluble material therefrom, hydrolyzing said solution, removing the precipitated $TiO_2$ and returning a portion of the precipitated $TiO_2$ to the process to mix with said ore.

2. A process for producing titanium dioxide which comprises the steps of extracting with $H_2SO_4$ a mixture of titanium-bearing ore containing in a combined form from 60–100 parts of iron for each 100 parts of titanium oxide and sufficient added titanium dioxide recovered in the subsequent hydrolysis to produce in the subsequently-formed acid solution a ratio of Fe content to $TiO_2$ content of less than 4:5, leaching said treated mixture and producing a solution having an iron content of from 70–80 parts per 100 parts of $TiO_2$, a specific gravity of from 1.4 to 1.6 and a free $H_2SO_4$ content of 1.6 to 1.8 mols per mol dissolved $TiO_2$, removing insoluble material therefrom, hydrolyzing the resulting solution, recovering the precipitated $TiO_2$ from said hydrolysis, and returning a portion thereof to the ore grinding step of the process for admixture with the ore undergoing grinding and particle size reduction.

3. A process for producing titanium dioxide which comprises the steps of extracting with $H_2SO_4$ a mixture of titanium-bearing ore containing in a combined form from 60–100 parts of iron for each 100 parts of titanium oxide and sufficient added titanium dioxide recovered in the subsequent hydrolysis to produce in the subsequently-formed acid solution a ratio of Fe content to $TiO_2$ content of less than 4:5, leaching said treated mixture and producing a solution having an iron content of from 70–80 parts per 100 parts of $TiO_2$, a specific gravity of from 1.54 to 1.57 and a free $H_2SO_4$ content of about 1.7 mols per mol dissolved $TiO_2$, removing insoluble material therefrom, hydrolyzing the resulting solution, recovering precipitated $TiO_2$ from said hydrolysis, and returning a portion thereof to the ore grinding reduction step of the process for admixture with the ore undergoing grinding.

ROBERT M. McADAM.